US009384069B2

(12) United States Patent
Lee et al.

(10) Patent No.: US 9,384,069 B2
(45) Date of Patent: Jul. 5, 2016

(54) METHOD FOR EVENT PROCESSING USING HIERARCHICAL STRUCTURES AND EVENT PROCESSING SYSTEM THEREOF

(71) Applicant: LG CNS CO., LTD., Seoul (KR)

(72) Inventors: Sang Woo Lee, Bucheon-si (KR); Jae Man Kim, Bucheon-si (KR); Sang Yoon Lee, Seoul (KR); Yoo Jin Chang, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 13/906,515

(22) Filed: May 31, 2013

(65) Prior Publication Data

US 2013/0347007 A1   Dec. 26, 2013

(30) Foreign Application Priority Data

May 31, 2012  (KR) .................. 10-2012-0058755

(51) Int. Cl.
*G06F 9/54* (2006.01)
(52) U.S. Cl.
CPC ...................... *G06F 9/542* (2013.01)
(58) Field of Classification Search
CPC ........................................... G06F 9/542
See application file for complete search history.

(56) References Cited

U.S. PATENT DOCUMENTS

| 6,272,672 | B1 * | 8/2001 | Conway .................. 717/107 |
| 2007/0255529 | A1 * | 11/2007 | Biazetti et al. ............. 702/186 |
| 2010/0070981 | A1 * | 3/2010 | Hadar et al. .................. 719/318 |
| 2011/0126201 | A1 * | 5/2011 | Iyer et al. ..................... 718/102 |
| 2012/0124353 | A1 * | 5/2012 | Rehman ............................ 713/1 |
| 2013/0132978 | A1 * | 5/2013 | Opher et al. ................ 719/318 |
| 2013/0290241 | A1 * | 10/2013 | Taylor ..................... G06N 5/02 706/55 |

FOREIGN PATENT DOCUMENTS

| KR | 10-2007-0044200 A | 4/2007 |
| KR | 10-0811433 B1 | 2/2008 |

OTHER PUBLICATIONS

Korean Office Action issued in Application No. 10-2012-0058755 dated Jul. 9, 2013.

* cited by examiner

*Primary Examiner* — Charles E Anya
(74) *Attorney, Agent, or Firm* — KED & Associates, LLP

(57) ABSTRACT

Provided is a method for event processing and a system for using the same. The system for event processing in a computer may include an interface to detect an input associated with an event, an event definition engine which defines the event using a plurality of event components and a corresponding event component wrapper wrapping each of the plurality of event components, an event processing engine which processes the event, and an event action module to generate an output based on the event. The event definition engine may determine a hierarchical relationship between the plurality of event components and assigns the hierarchical relationship in the corresponding event component wrapper. Moreover, the event processing engine may execute each of the event components according to the hierarchical relationship assigned in the event component wrapper.

17 Claims, 14 Drawing Sheets

| Event component | Description |
|---|---|
| event source | related to outside event determination request, mapped with event processing triggering data, and becomes the starting point of event processing |
| DB query | inquires information from outside DB |
| stream | inquires operation summary information such as a series of data element itself or their average and summation inputted or generated for a period |
| rule determination | determines formula, acquires result values thereof, and determines whether the following processes should be executed |
| action | transfers result values to place requesting event processing |

FIGURE 2

METHOD FOR EVENT PROCESSING USING HIERARCHICAL STRUCTURES AND EVENT PROCESSING SYSTEM THEREOF

CROSS-REFERENCE TO RELATED APPLICATION

This application claims priority under 35 U.S.C. §119 to Korean Application No. 10-2012-0058755 filed on May 31, 2012, whose entire disclosure is hereby incorporated by reference.

BACKGROUND

1. Field

The present disclosure relates to an event processing technology, and more particularly, to an event processing method using a hierarchical structure, an event processing engine using the same, and a system thereof.

2. Background

An event processing technology has been developed variously as a main technology importantly impacting the efficiency and performance of computer systems.

An example of prior event processing schemes is performed by the following steps: (i) define execution events for business events, (ii) determine conditions by rule operations when the events are generated from source data, and then (iii) perform the predetermined event processing as the business events when the generated events are the execution events.

However, such an event processing technology may have various disadvantages. For example, when processing the events, each event with a different action but the same function must be newly instantiated due to the reuse limitation for rule operation definitions. Hence, because the event process cannot be reused, the cost for necessary system resources is increased. Further, it does not use middle operation values produced from an arithmetic operation process of the event processing processes, defines components called indicators separately if middle operations are necessary, stores the indicators into database, and inquiries them, thereby lowering system performance due to needed database accesses. Due to these and other disadvantages, data processing for large quantity of data in real time is substantially difficult such that an extensive complex event processing cannot efficiently be performed.

An example of such technology is described in Korean Patent Registration No. 10-0811433. Here, the events include executing types and rules, the executing types become the categories such as simple events, collection events, reference events, connection events or standby events, wherein individual events may be connected to another events in case of the connection events of the categories of the executing types. Complex events are a generalization of complex relations among the executing types, rules and business events. A complex event processing system includes an event sensor (Sensor), an event processing section (CEP:Complex Event Processing), and an event action section (Action). The event sensor collects data from source and transfers the collected data to the event processing section, and the event processing section processes the events according to the contents defined with data collected from the event sensor and produces action plans. The event action section executes the action plans produced from an event engine of the event processing section according to the defined action plan processing contents.

However, this technology uses the structure having four standardized definition/processing steps configured with definition of event triggering data definition, combination of execution types, rule determination, and actions, and therefore, there is a constraint that the rule operation definition is possible only once in one event. Therefore, when additive event processing or rule determinations according to rule determination results are necessary, there is a limitation that has to additively define the complex events. Further, dependency for execution types is caused on combining simple, collection, reference, connection and standby events configuring the execution types and setting input/output information necessary to the processing, and therefore, there is a limitation of not being capable of performing reuse in different execution types or different complex events. In addition, due to the structure using a plurality of queues and processors in the event processing processes, there are disadvantages that time between the processing steps is cut, minimum response time becomes long, and resource share of each processor should be separately managed.

Accordingly, provided herein is an improved event processing method and an event processing system using the same that enable complexity and degree of freedom of the events provided by componentizing the components for event definitions, hierarchically combining the components, and representing various event definitions.

Further, another advantage of some aspects of the disclosure is an event processing method and an event processing system using the same that enable increased reusability of the event components by delegating the hierarchical structure of the event components and input/output value mapping into the event component wrapper and input/output value wrapper on defining the events.

Further, still another advantage of some aspects of the disclosure is an event processing method and an event processing system using the same that enable high performance and efficiency for the event processing by transferring information necessary to the event processing by parameter types and in advance producing and then reusing the event process at the time of producing and changing the event definitions.

The event processing system as broadly described and embodied herein performs a predetermined event processing for input data. The event processing system may include an event definition engine and event processing engine. The event definition engine may use a plurality of event components for the event processing and a plurality of event component wrappers wrapping the plurality of event components, respectively, to define the events. The event processing engine may process the events according to the hierarchical structure between the event components.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 2 is a view explaining event components in the present disclosure;

DETAILED DESCRIPTION

Hereinafter, exemplary embodiments of the present invention will be described in detail. The following examples are provided only for illustrative purposes, and the scope of the present invention should not be interpreted as being limited by these examples. Since the present invention may be variously modified and have several exemplary embodiments, specific exemplary embodiments will be shown in the accompanying drawings and be described in detail. However, it is to be understood that the present invention is not limited to the specific exemplary embodiments, but includes all modifications, equivalents, and substitutions included in the spirit and the scope of the present invention.

In describing exemplary embodiments, well-known functions or constructions will not be described in detail since they may unnecessarily obscure the understanding of the present invention.

Terms used in the specification, such as "first", "second" etc, can be used to describe various components, but the components are not to be construed as being limited to the terms. The terms are only used to differentiate one component from other components. For example, the first component may be named the second component and the second component may also be similarly named the first component, without departing from the scope of the present invention.

It is to be understood that when one element is referred to as being connected to or coupled to another element, it may be connected directly to or coupled directly to another element or be connected to or coupled to another element, having the other element intervening therebetween. On the other hand, it is to be understood that when one element is referred to as being connected directly to or coupled directly to another element, it may be connected to or coupled to another element without the other element intervening therebetween. Terms used in the present specification are used only in order to describe specific exemplary embodiments rather than limiting the present invention.

Singular forms are intended to include plural forms unless the context clearly indicates otherwise. It will be further understood that the terms "comprises" or "have" as used in this specification specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those as understood by those who are skilled in the art. It should be understood that the terms defined by a dictionary must be identical with the meanings within the context of the related art, and they should not be ideally or excessively formally defined unless the context clearly dictates otherwise.

Figure 1:
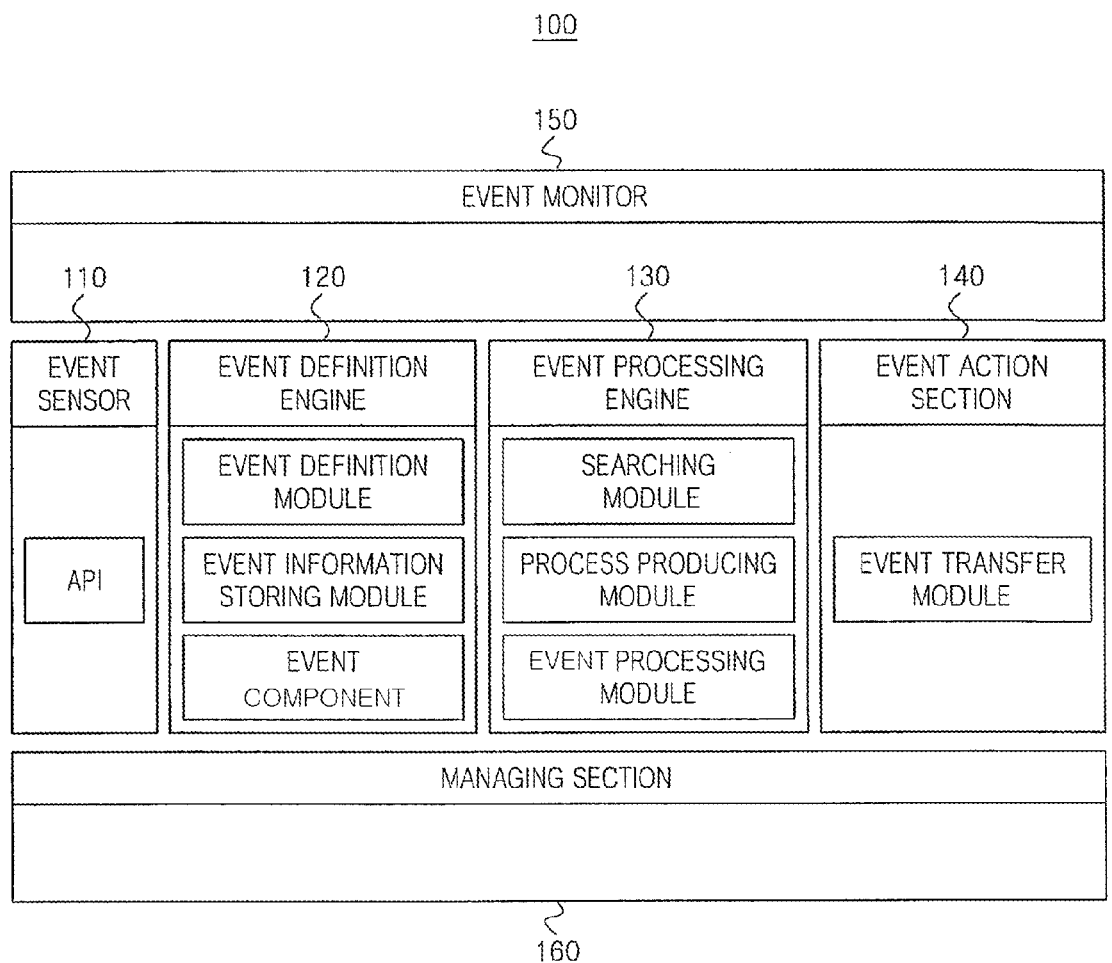
FIG. 1 is a block diagram illustrating an event processing system according to an embodiment of the present disclosure.

FIG. 1 is a block diagram illustrating an event processing system according to an enclosed technology. An event processing system 100 may include an event sensor 110, an event definition engine 120, an event processing engine 130 and an event action section 140. The event processing system 100 may further include at least one of an event monitor 150 or a managing section 160 in certain embodiments.

When data is generated from a data source system, the event sensor 110 may sense the generated data to be one which is related to the events. The event sensor 110 may provide the sensed source data to the event definition engine 120 or the event processing engine 130. For example, the event sensor 110 may provide data related to event producing (definition) to the event definition engine 120 and may provide data for event processing to the event processing engine 130.

The event sensor 110 may include sensing APIs in certain embodiments. The sensing APIs may provide the event definitions necessary to determine the source data as the events, and APIs for processing them. It is possible to define the events or to process the defined events by accessing (calling) the event processing system 100 through the sensing APIs from the outside.

The event sensor 110 may use real-time or periodic extraction schemes when collecting source data. For example, the event sensor 110 may use one or any combination of a real-time extraction scheme performed by agent monitoring, a periodic extraction scheme performed by folder monitoring, a real-time (event queue) transmission scheme using Open API (Application Programming Interface) or a real-time transmission scheme using JMS (Java Message Service).

The event definition engine 120 may use event components and event component wrappers that wrap the event components to set the hierarchical structure to define the events. For example, the event definition engine 120 may use at least one event component as independent function units for the event processing, and at least one event component wrapper that wraps at least one event component, respectively, and therefore sets the hierarchical structure of the corresponding event component, to define the events.

The event definition engine 120 will be described in more detail with reference to FIG. 2 to FIG. 8 hereinafter.

The event processing engine 130 may process the events defined by the event definition engine 120. The event processing engine 130 may process the events defined by using the collection of event component processes having the same hierarchical structure as the events defined by the event definition engine 120. The event processing engine 130 may produce at least one event component process to be corresponded to at least one event component, respectively, included in the defined events, and may construct at least one event component process having the hierarchical structure that becomes equal with at least one event component having the hierarchical structure, to process the defined events.

The event processing engine 130 will be described in more detail with reference to FIG. 9 to FIG. 12 hereinafter.

The event action section 140 may transfer event processing results according to the event definitions. For example, the event action section 140 may transfer the corresponding contents by methods such as SMS, E-mail, DB Insert, or the like according to transfer methods defined for each event.

The event monitor 150 may perform real-time monitoring, event monitoring, sensor monitoring, queue monitoring, processing status monitoring, etc., generated in a complex event processing system.

The managing section 160 may manage information necessary to perform an event processing. The managing section 160 may perform the functions such as a user or role management, event engine execution or stop, or system environment variables management.

The event definition engine 120 and the event definitions generated by it will be described in more detail with reference to FIG. 2 to FIG. 8 hereinafter. FIG. 2 is a view explaining event components, and FIG. 3 is a block diagram illustrating events defined as the event components having a hierarchical structure.

The event definition engine 120 shown in FIG. 1 may define the event components for storing information necessary to perform various tasks such as event processing, and may represent the event components having the hierarchical structure, thereby to define the event processing. Referring to FIG. 2, the event components may include an event source component, a DB query component, a stream component, a rule determination component, and an action component. It should be appreciated, however, that the event definition engine 120 may add various types of unit tasks not shown in FIG. 2 as separate event components.

Figure 3:
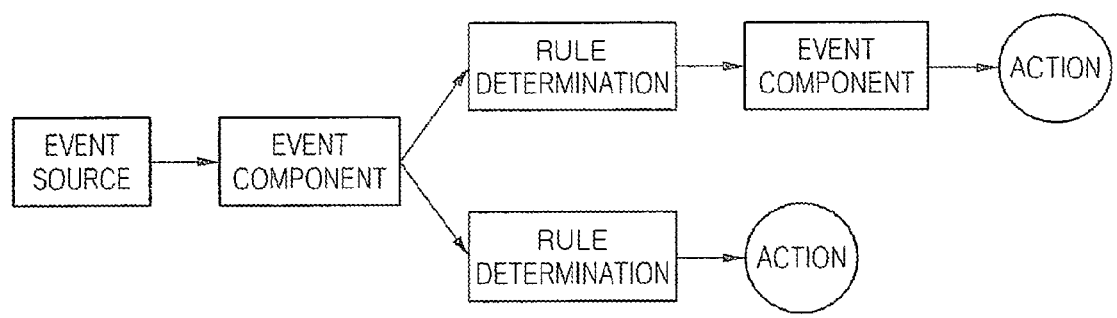
FIG. 3 is a block diagram illustrating events defined as event components having a hierarchical structure.

FIG. 3 shows an example of defining the events according to event components having the hierarchical structure. The defined events may begin with an event source component and end with an action component as shown in the example. That is, the hierarchical structure may always start with the event source component, and the action component may be used at the end only. The hierarchical structure may be branched using rule determination components.

The event definition engine 120 may use a tree structure in which the event source component becomes a root node and the action component becomes a leaf node, thereby to define the events. Moreover, the event definition engine 120 may define the event to have various structures irrespective of the number and branching points of the event components.

Figure 4:
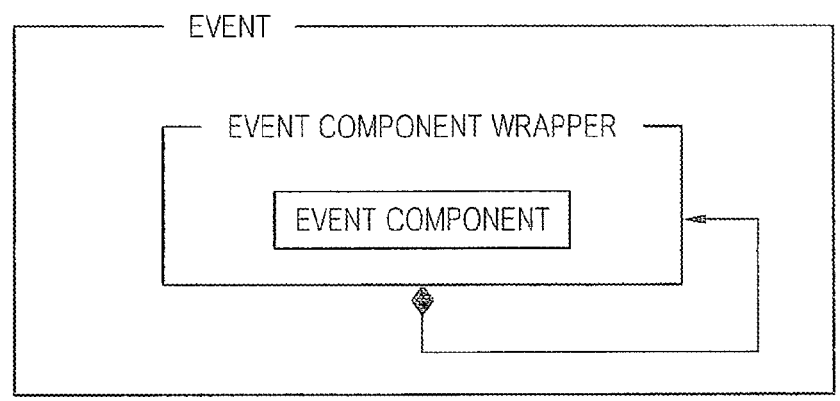
FIG. 4 is a diagram illustrating the hierarchical structure configured by event component wrappers according to the present disclosure.
Figure 5:
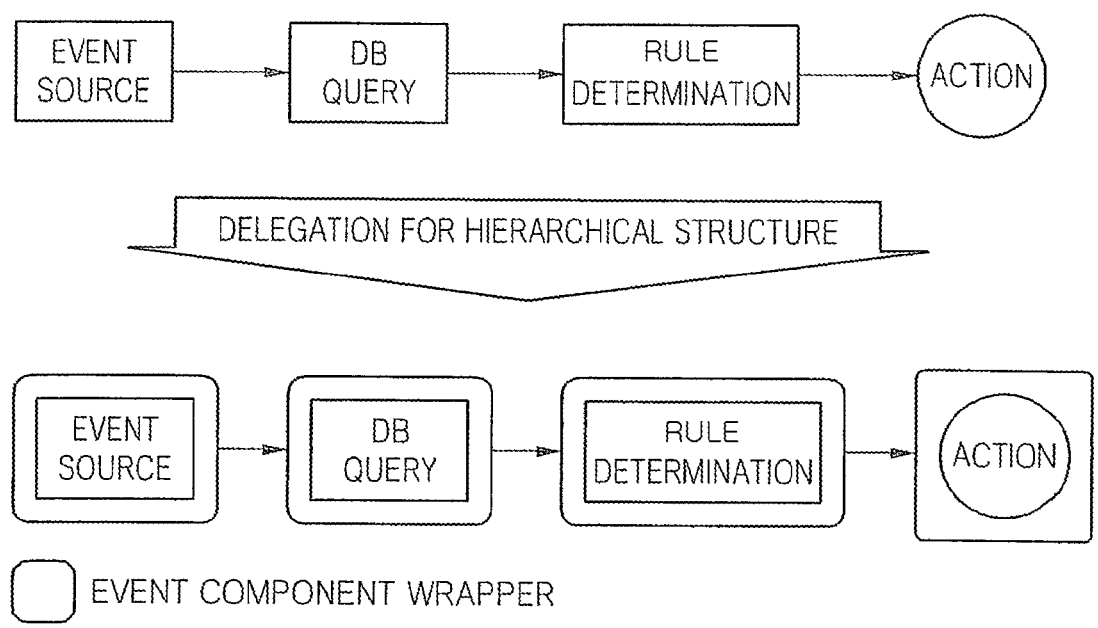
FIG. 5 is a block diagram illustrating the hierarchical structure configured by the event component wrappers.

FIG. 4 is a diagram illustrating the hierarchical structure configured by event component wrappers, and FIG. 5 is a block diagram illustrating a hierarchical structure configured by the event component wrappers. If the events are defined with respect to relationships only between the event components, one event component must be aware of event components to be subsequently executed based on the hierarchical structure. In such a case, when the events having the same determination process are defined to many events, it is not convenient to repeatedly define event components having the same processing contents. Therefore, in order to avoid this and enable reusability of the event components, event component wrappers may be used to eliminate the dependence of event components due to the hierarchical structure. That is, the event component wrappers may function as function entities for representing the hierarchy for the event components.

As illustrated in FIG. 4, the event component wrappers may have one event component, and may have a logical relationship with a plurality of other event component wrappers. In one embodiment, the event component wrappers may be logically and directly mapped with at least one second event component wrapper wrapping a first event component related and wrapped with oneself and at least one second event component related directly, to set the hierarchical structure. For example, a first event component wrapper may be mapped to at least one second event component wrapper to define the hierarchical relationship, the first event component wrapper wrapping a first event component and the second event component wrapper, and the second event component wrapper wrapping a second event component. In one embodiment, the event component wrappers may set the mapping in one direction for the second event component wrapper to be executed after oneself is performed, to set the hierarchical structure.

The events defined as the connection between the event components configured with an event source component, a DB query component, a rule determination component, and an action component are shown in FIG. 5. These events may be defined based on the connections between the event component wrappers. As shown, each event component wrapper may wrap corresponding event components one by one and represent the connection in the hierarchical structure instead of the event components themselves.

The event definition engine 120 may define the events with an event component, an event component wrapper and an event context. In addition, the event definition engine 120 may define the events with a hierarchical combination configured by the event component wrappers.

Each event component may include information necessary to perform various tasks necessary to process the events. In addition, the event components may include the definition information for the input/output values necessary to the event processing tasks, and the definition information may be used when exchanging actual values necessary to the processing in the event context through the event component wrappers.

When the combination for the event components is completed, the event definition engine 120 may input the combination of event components to the event component wrappers one by one and store the combination for the event components according to the hierarchical structure. At this time, the event definition engine 120 may set information being brought from the event context according to the input values of the event components and information being stored into the event context according to the output values of the event components to the event component wrappers. Until now, the event components do not need to know detailed information of the event component wrappers, while the event component wrappers knows detail information in the event component, and hence, the event component may independently exist with the events. Therefore, it is possible to reuse the event components.

The event definition engine 120 may record the defined events into a separate storagedevice and may load the recorded event information from the storagedevice when the event processing is performed. Hence, the event processing tasks may be processed more quickly.

Figure 6:
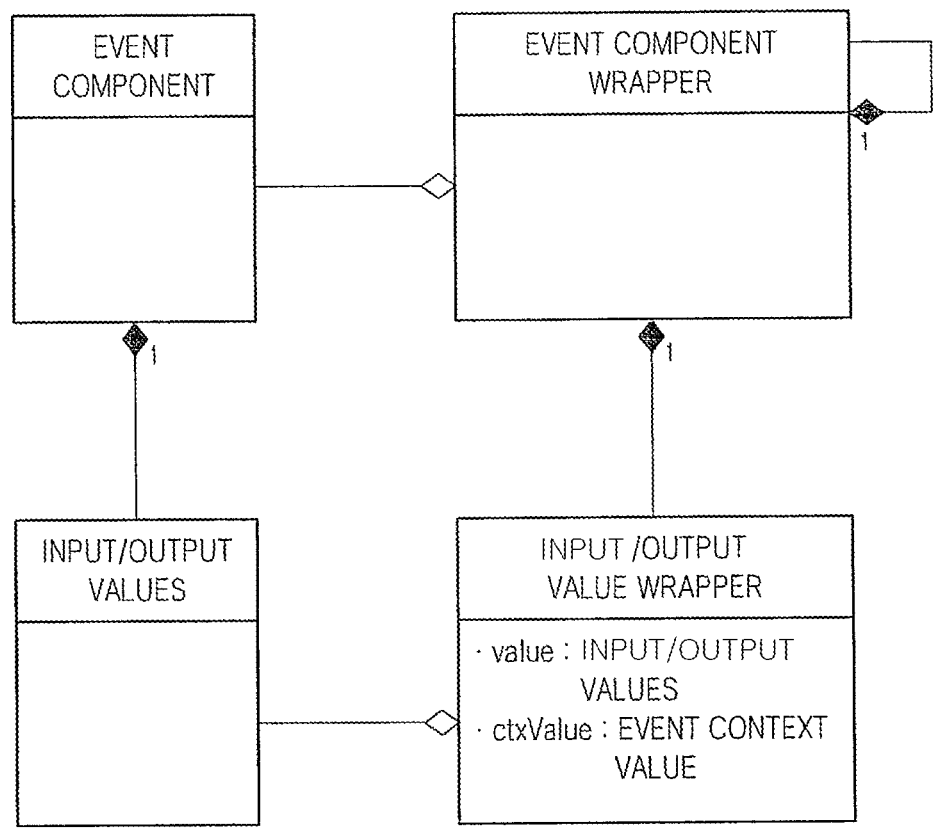
FIG. 6 is a class diagram illustrating a configuration of an event component, input/output values and wrapper entities thereof according to the present disclosure.
Figure 7:
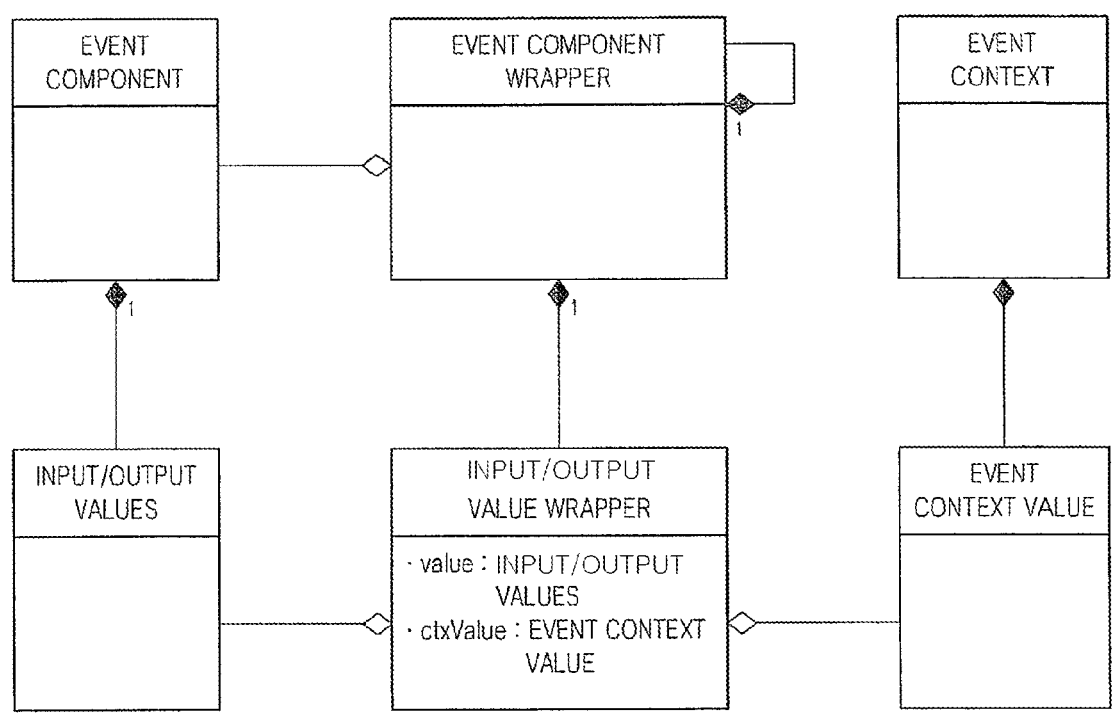
FIG. 7 is the class diagram illustrating a configuration of the entities for mapping between input/output values according to the present disclosure.
Figure 8:
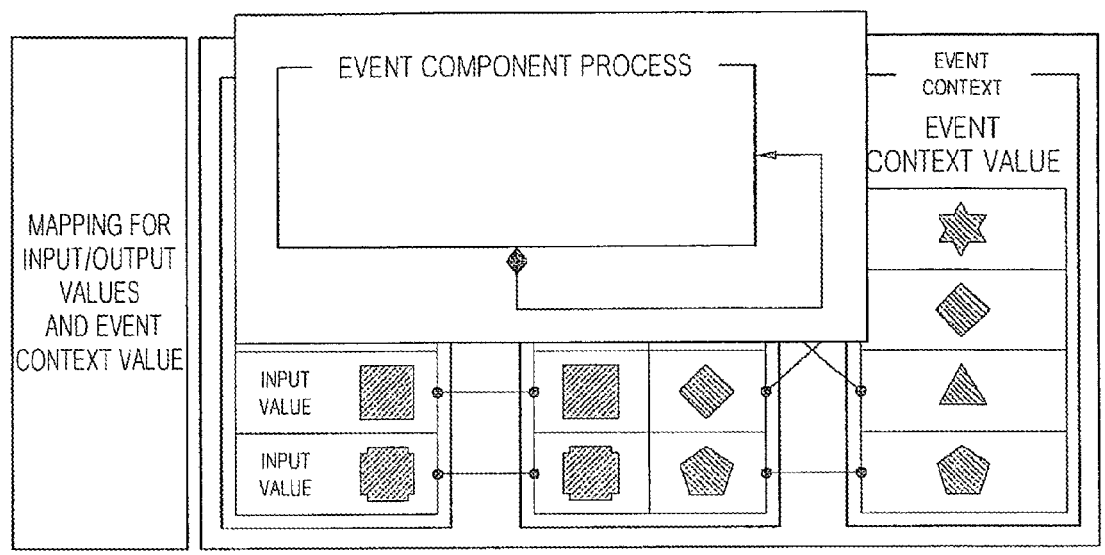
FIG. 8 is a block diagram illustrating input/output value wrappers according to the present disclosure.

FIG. 6 is a class diagram configured with event components, input/output values and wrapper entities thereof, and FIG. 7 is the class diagram configured with entities for mapping between input/output values. FIG. 8 is a diagram illustrating input/output value wrappers.

The event components may have information necessary to process the events, that is, input/output values. In the event definition engine 120, the event components having the hierarchical structure may use the event component wrappers to remove dependency between the event components, and the event component wrappers may be used for the input/output values of the event components. FIG. 6 illustrates the relationship of input and output values—input/output value wrappers extended in the same type as the relation of the event components—the event component wrappers.

For example, referring again to FIG. 5, when the resulting values of the DB query component is defined as the output values and the output values become the input values of the rule determination component to perform rule determination, the relation of DB query output values-rule determination input values may be delegated as the relation between the input/output value wrappers. The output values of one event component wrapper are related to the input values of a subsequent event component wrapper and the input values of one event component wrapper are related to the output values of other one event component wrapper such that a cross-reference relation may be produced.

The cross-reference relation is difficult to modify and therefore its reusability is lowered because a ripple effect modifying any one input/output values is bilaterally propagated. The cross-reference relation between the input/output value wrappers of the event component forming the hierarchical structure in terms of visibility becomes complex as a web shape. To prevent the lowering of the reusability and remove complexity thereof, the event definition engine 120 may use the entities to mediate the mapping between the input/output values together with the input/output value wrappers, that is, the event context values. The event context values used in the specific events may be included in a container called an event context for the convenience of management.

FIG. 7 shows the relationship between the entities substituting the representation for the hierarchical structure and the mapping for the values, to secure the reusability for the event components and the input/output values.

FIG. 8 shows the mapping for actual input/output values and the event context values by the relation between the entities, wherein arrows may represent the direction of data transfer. For example, the event definition engine 120 may be performed to be output in relation with a first event context value according to the mapping relation included in the input/output value wrappers for first output value, represented by star, of the input/output values. For another example, the event definition engine 120 may read the values from the event context, represented by diamond, according to the mapping relation represented in the input/output value wrappers for third input value, represented by rectangle, of the input/output values.

The event processing engine 130 and the event processing performed by it will be described in more detail with reference to FIG. 9 to FIG. 12 hereinafter. The event processing engine 130 of FIG. 1 may perform the event processing based on the defined events. To this end, the event processing engine 130 produces the event component processes corresponding to the event components, performs the corresponding logics according to sequential connection relations for them, and therefore may perform the event processing.

The event component processes, which are logics performing the event processing tasks, use information of the event components, the event component wrappers, and the event context. One component process may be present in one event component. Therefore, upon needing new logics for the event processing, only the event component processes corresponding to the event components may beadded, without changing the event definition structure, to enable flexible and fast response.

The event processing engine 130 performs an event component process producing step and an event component process executing step, to perform the event processing.

Figure 9:
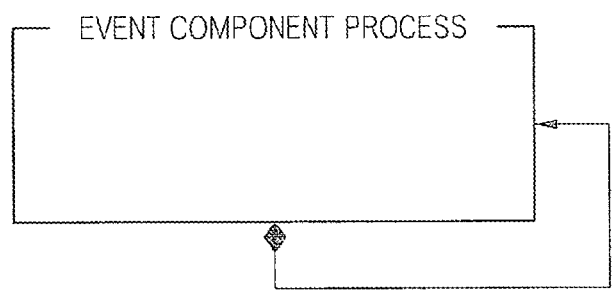
FIG. 9 is a block diagram illustrating event component processes having the hierarchical structure.

FIG. 9 shows the hierarchical structure in the event component processes. The event component processes are produced by 1:1 according to the event components configuring the events and may have the same hierarchical structure as that of the event component wrappers.

Figure 10:
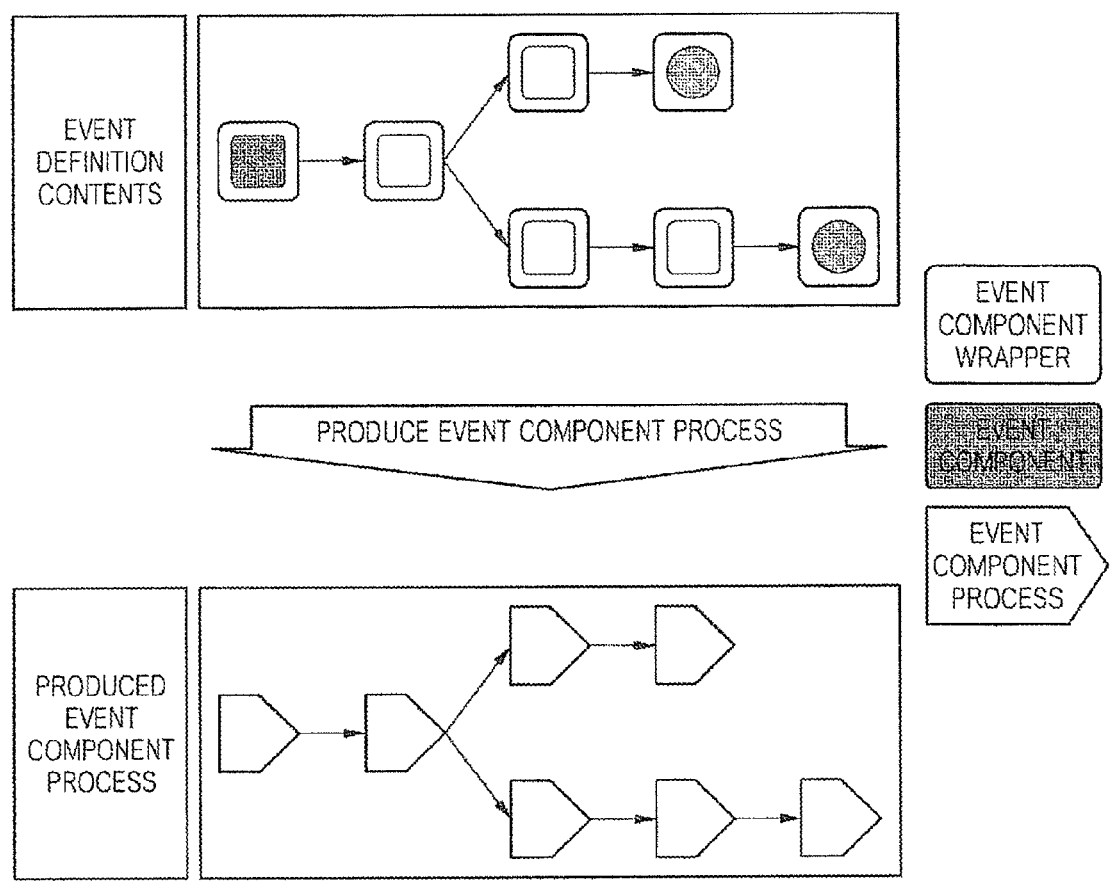
FIG. 10 is a block diagram illustrating the event component processes having the hierarchical structure produced according to event definitions.

The event processing engine 130 sequentially inquires the event component wrappers, having the hierarchical structure, of the event definitions, searches (checks) the event components, and produces the event component processes corresponding to the checked event components. The event processing engine 130 may produce the event component processes having the hierarchical structure. For example, the produced event component processes may be stored into the previous event component processes. The event processing engine 130 repeatedly performs these procedures according to the event definitions, and therefore produces the event component processes having the hierarchical structure having the same structure as the event component wrappers having the hierarchical structure. FIG. 10 shows the event component processes having the hierarchical structure produced according to the event definitions.

The event processing engine 130 sequentially searches the produced event component processes having the hierarchical structure one by one, to perform the logics in the corresponding event component processes. For example, the event processing engine 130 may sequentially search the event component processes produced as the hierarchical structure (search the event component processes having the hierarchical structure). The event processing engine 130 may perform the tasks according to the logics in the corresponding event component processes. At this time, the event processing engine 130 brings the input values defined in the event components and the event component wrappers from the event context to perform the logics, and stores the completed results into the event context according to the definition of the output values (perform the event component processes). The event processing engine 130 repeatedly performs these procedures according to the event component processes having the hierarchical structure, to complete the event processing.

Figure 11:
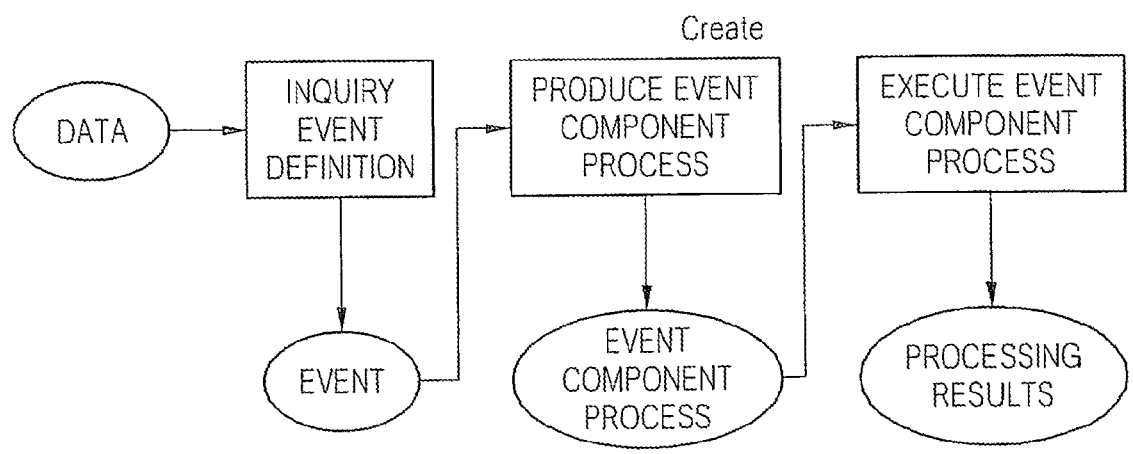
FIG. 11 is an order flow chart for one embodiment of an event processing method performed by an event processing engine according to the present disclosure.
Figure 12:
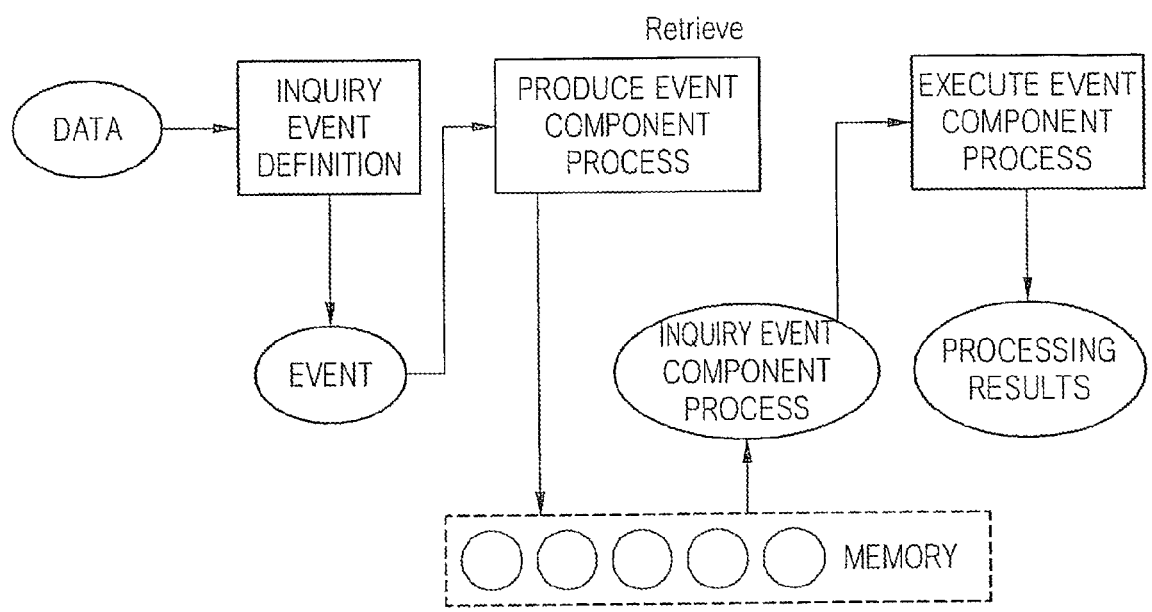
FIG. 12 is an order flow chart for one embodiment of an event processing method performed by an event processing engine according to the present disclosure.

FIG. 11 shows a flow chart of an event processing method performed by the event processing engine according to the present disclosure, and FIG. 12 shows a flow chart of another example of the event processing method performed by the event processing engine according to the present disclosure.

Referring to FIG. 11, the event processing engine 130 inquires the event definition information, and may produce the event component processes according to the event definition information. The event processing engine 130 may perform the event processing according to the produced event component processes. The event information defined once is not varied before the generation of the event modification/deletion. Therefore, since the event component processes are also not varied while the event information is not varied, it is unnecessary to perform the event component process producing tasks for each event processing. When the event definitions are completed, after performing the event component process producing tasks once only and storing them into a memory, it is more efficient to bring and use the existing produced event component processes on processing the event, and the above contents, as illustrated in the flow chart of FIG. 12.

In FIG. 12, the event processing engine 130 inquires the event definition information, inquires the event component processes from the memory, and therefore brings them. When inquiry results are absent, the event processing engine 130 produces the event component processes according to the event definition information, and stores the produced event component processes into the memory. The event processing engine 130 may perform the event processing according to the event component processes. Such use of memory is faster and may provide the event processing results without delaying in case of requesting high speed processing, and the event component processes are produced according to the event definitions. Accordingly, the event processing processes may reduce minimum response times by removing queues and processors for each step as compared with the existing technologies and may efficiently use CPU resources without managing the resource of the processors.

Figure 13:
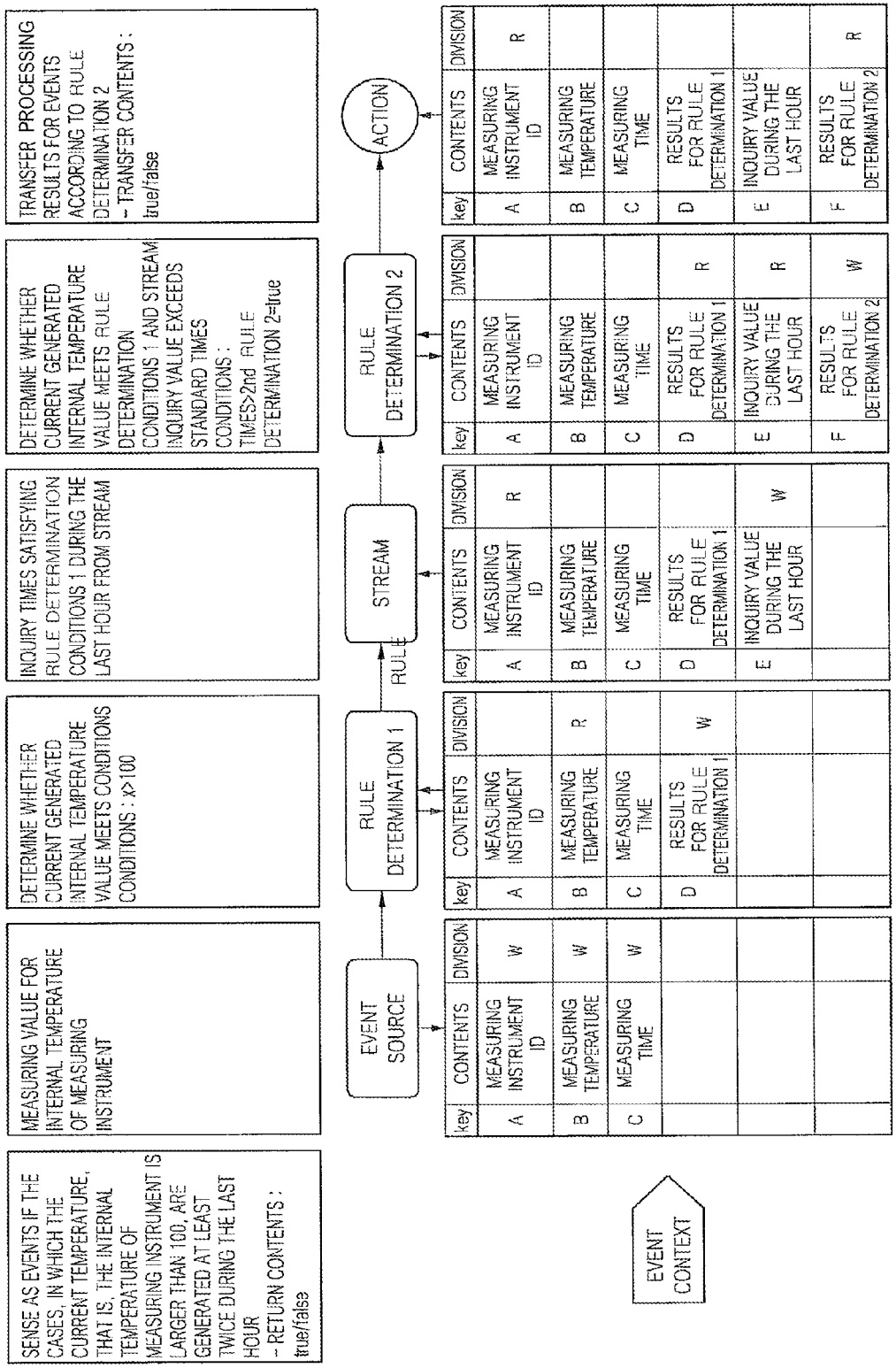
FIG. 13 is a block diagram illustrating an implementation of an event design according to the present disclosure.
Figure 14:
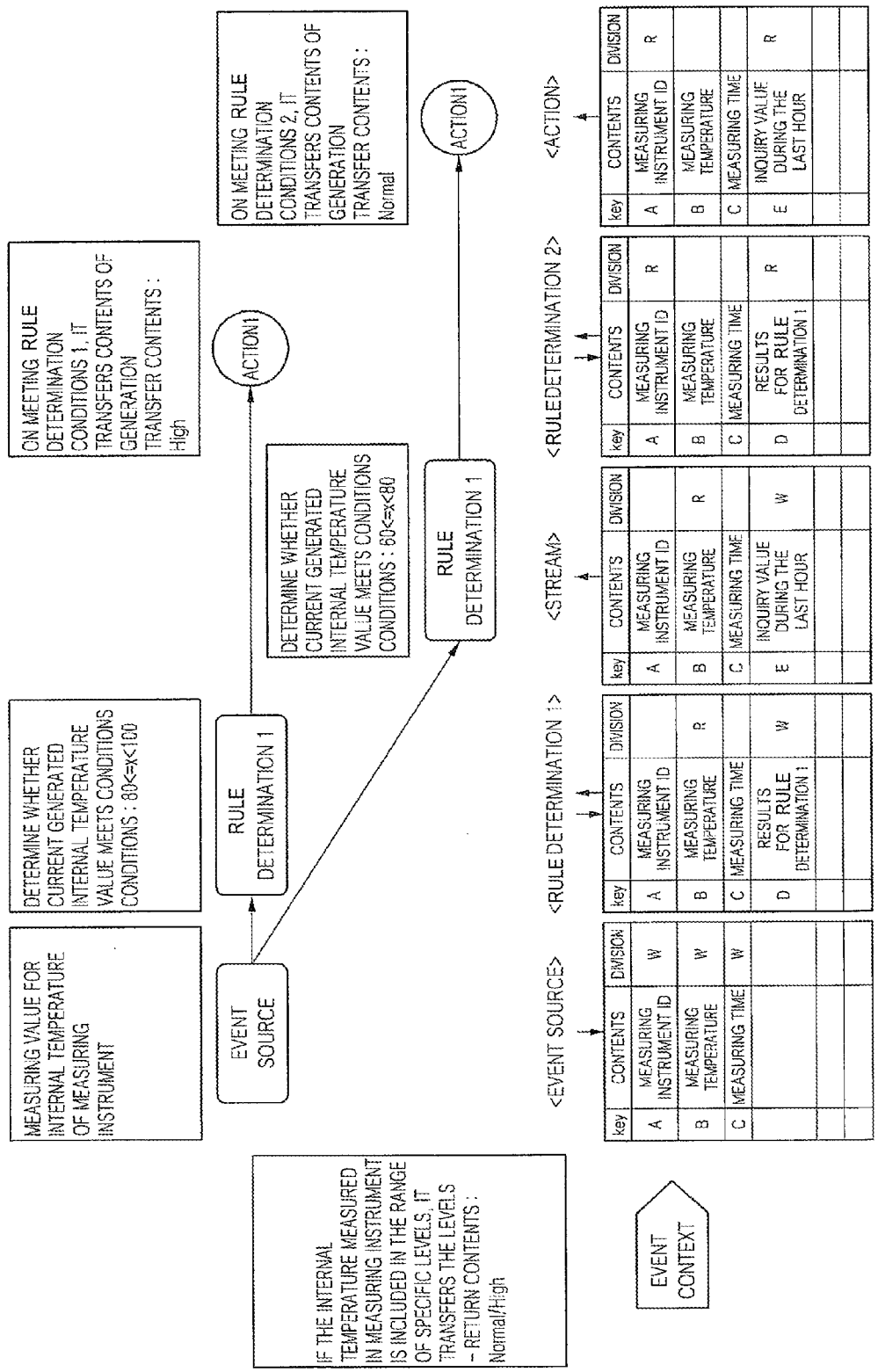
FIG. 14 is a block diagram illustrating another implementation of the event design according to the present disclosure.

FIG. 13 is a diagram illustrating an exemplary event design according to the present disclosure, and FIG. 14 is a view illustrating another example of an event design according to the present disclosure. FIGS. 13 and 14 show tables which include event context information (ECI) including, for example, a column (Contents) for various contents and a column (Division or Note) including indicia as to whether each content has been read (R) or written (W) to memory.

The events of FIG. 13 sense when the current temperature, that is, the internal temperature of a measuring instrument is greater than 100, are generated at least twice during the past hour. The event processing system 100 uses an event source component, two rule determination components, and a stream component, and combines the hierarchical relation using the event component wrappers to configure the action section.

For example, without the system as illustrated in FIG. 13, an event 1 (in the case that the current temperature is larger than 100) is configured as connecting events, and therefore, an event 2 is defined to be designed to enable twice generation to check by the rule determination components. Here, two events have to be defined as the structures that use the connecting events. This results in steps which are more complex and difficult. In contrast, the implementation of the presently described system and method simplifies defining the events, as illustrated in FIG. 13

In FIG. 14, the events measure the internal temperature of the measuring instrument, and therefore, when the internal temperature is included in the range of levels (or intervals), transfers the range of levels orintervals. Here, the range of levels orintervals include High (e.g., 80<=temperature<100) and Normal (e.g., 60<=temperature<80). The event processing system 100 combines an event source component, two rule determination components and two action components by the event component wrappers, and therefore, may be designed so that different actions are transferred according to rule determination. On the other hand, it had to define that different events having the same contents and the conditions only of levels of different interval is two in conventional systems.

Hereinafter, various embodiments for the event processing method will be described with reference to FIG. 15 and FIG. 16. Hereinafter, the corresponding contents of various embodiments for the event processing method is not described to avoid duplication as mentioned with reference to FIG. 1 to FIG. 14.

Figure 15:
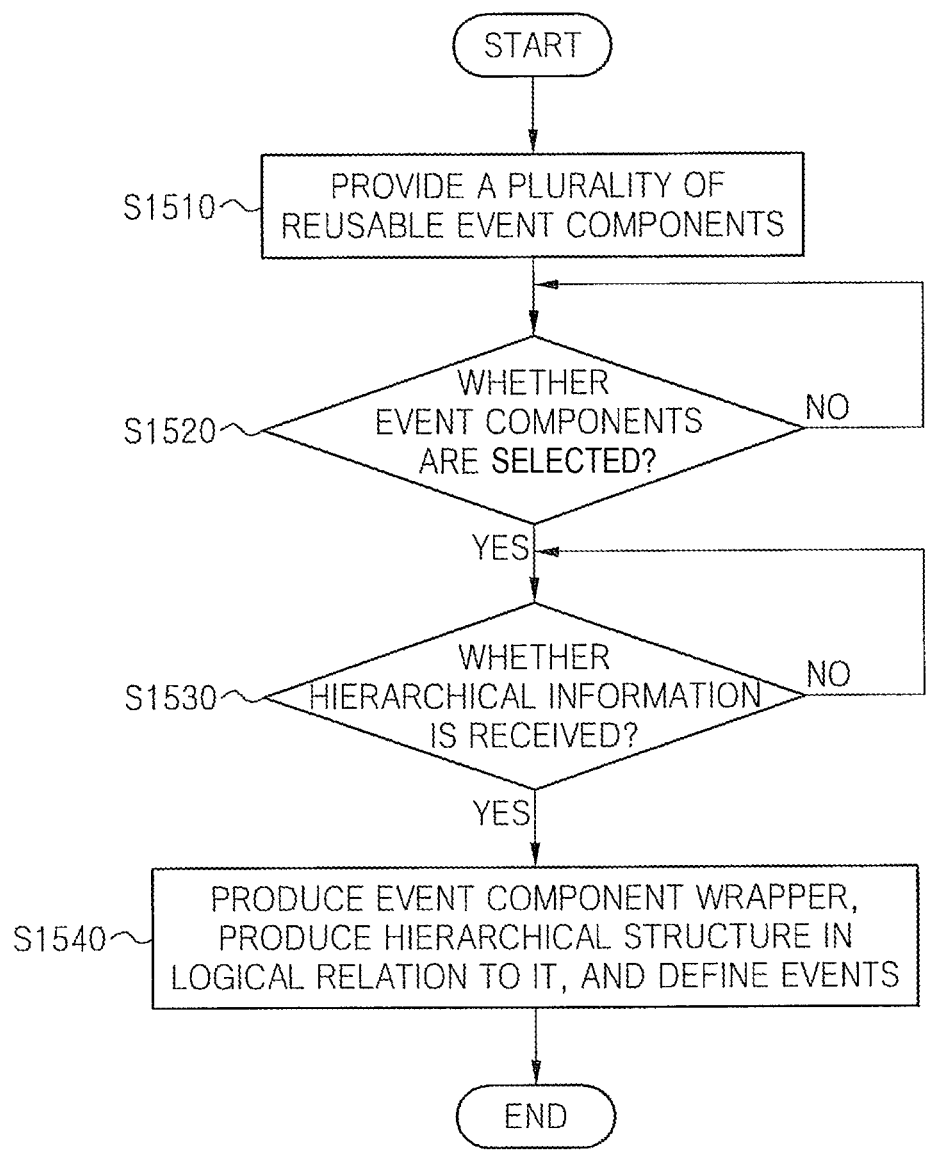
FIGS. 15 and 16 are flow charts of the event processing method according to the present disclosure.

FIG. 15 is a flow chart of an event processing method according to the present disclosure. One embodiment for the event processing method disclosed in FIG. 15 may be related to an embodiment related to the event definitions as previously described.

In the event processing method of FIG. 15, the event processing system 100 may provide independent function units, that is, a plurality of reusable event components for the event processing, in step S1510.

In the event processing system 100, it may be determined whether event components are selected, in step S1520. When at least one event component is selected from a plurality of provided event components (step S1520, YES), it may determine whether information of hierarchical structure for at least one selected event component is received, in step S1530.

If hierarchical information is received (step S1530, YES), the event processing system 100 produces at least one event component wrapper for wrapping at least one event component, respectively, produces the hierarchical structure corresponding to the information of the hierarchical structure in logical relation to at least one produced event component wrapper and therefore defines the events, in step S1540.

In one embodiment, a plurality of event components may include at least one of an event source component related to an outside event determination request, a database query component for acquiring the predetermined information on accessing an outside database, a stream component for producing operation information for data inputted during the predetermined period, a rule determination component capable of determining the execution or not of the following event components according to the predetermined formula, or an action component providing result data of the event.

In step S1530 and step S1540, the event processing system 100 may check whether the starting of the corresponding hierarchical structure is performed, for the received hierarchical structure information, by the event source component, and check whether the ending of the hierarchical structure is performed by the action component.

In step S1530 and step S1540, the event processing system 100 may produce the input/output value wrappers related to the input/output values of the corresponding event components for at least one of the event component wrappers, respectively.

Figure 16:
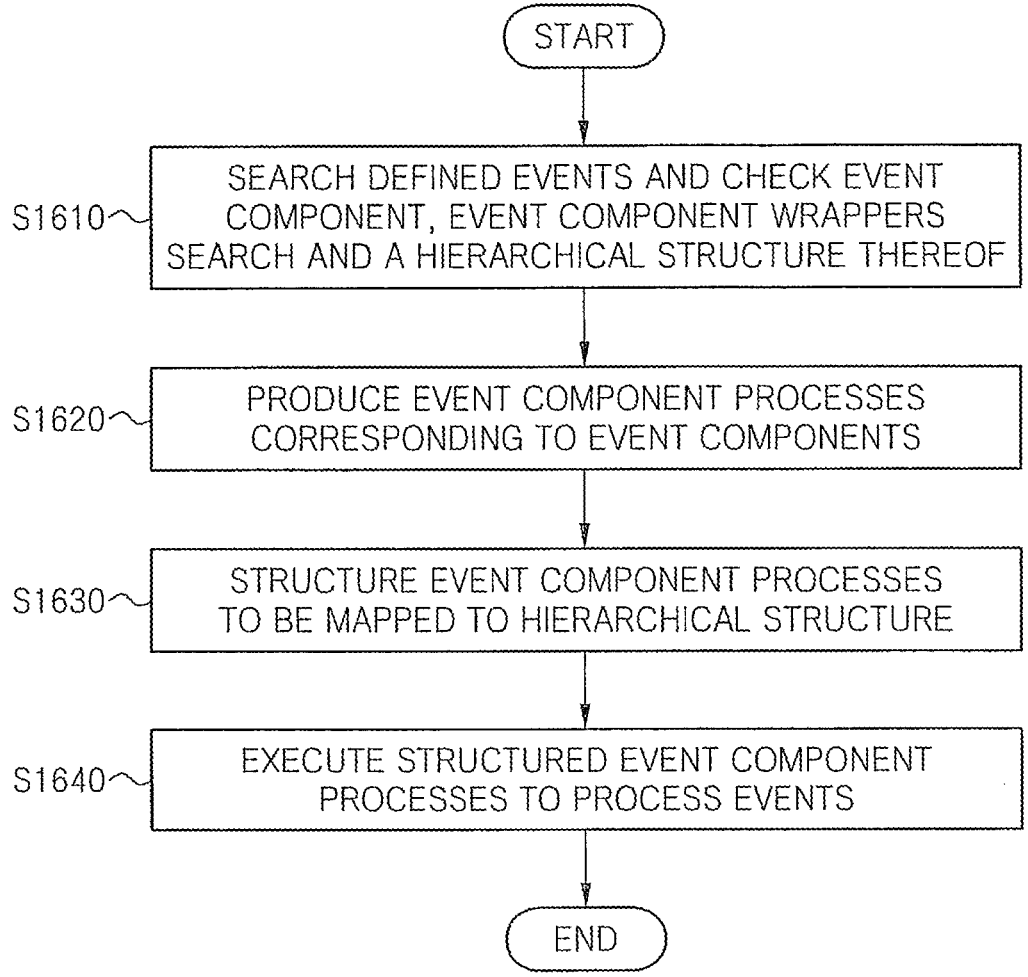

FIG. 16 is a flow chart illustrating another example of the event processing method according to the present disclosure. The event processing method disclosed in FIG. 16 may be related to an embodiment related to the processing of the defined events as previously described.

In the event processing method of FIG. 16, the event processing system 100 may search the existing defined events and check for at least one of an event component, event component wrappers and/or a hierarchical structure thereof included in the existing defined events, in step S1610.

The event processing system 100 may produce at least one event component process corresponding to at least one checked event component, respectively, in step S1620, and may structure at least one produced event component process to be mapped to the checked hierarchical structure, in step S1630. The event processing system 100 may execute at least one structured event component process to process the defined events, in step S1640.

In one embodiment, when the processing for the existing defined events is completed, the event processing system 100 may store the event definition information including the information of at least one produced event component process and the hierarchical structure thereof.

In one embodiment, when reprocessing for the existing defined events is requested, the event processing system 100 may check the event definition information for the corresponding events, and may reuse the information of at least one existing produced event component process and the hierarchical structure thereof for different event processing to perform the reprocessing.

In step S1620, the event processing system 100 may inquire the event component information stored in relation to the event component wrappers and produces the event component processes for the corresponding event component processing by inquiry result.

In step S1620, the event processing system 100 may check the existing stored event definition information before producing the event component processes, and therefore, when the corresponding event component processes are stored, may acquire the stored event component processes.

As broadly described and embodied herein, the method and system for event processing provides complexity and degree of freedom of the events by componentizing the components for the event definitions, hierarchically combining the components, and representing various event definitions.

Further, according to another embodiment of the present disclosure, the reusability of event components may be increased by delegating the hierarchical structure of the event components and input/output value mapping into the event component wrapper and input/output value wrapper when defining the events.

Further, according to still another embodiment of the present disclosure, higher performance and efficiency for the event processing may be realized by transferring information necessary to the event processing by parameter types and in advance producing and then reusing the event process at the time of producing and changing the event definitions.

In one embodiment, a system for event processing in a computer may include an interface to detect an input associated with an event, an event definition engine which defines the event using a plurality of event components and a corresponding event component wrapper wrapping each of the plurality of event components, an event processing engine which processes the event, and an event action module to generate an output based on the event. The event definition engine may determine a hierarchical relationship between the plurality of event components and assigns the hierarchical relationship in the corresponding event component wrapper. Moreover, the event processing engine may execute each of the event components according to the hierarchical relationship assigned in the event component wrapper.

The plurality of event components may be independent function units for the event processing. The event components may include at least one of an event source component related to an external event determination request, a database query component which acquires prescribed information related to the event from an external database, a stream component which produces operation information for data inputted during a prescribed period, a rule determination component which determines whether another event component is to be according to a prescribed formula, and an action component which provides an output of the event processing.

The event definition engine may use a tree structure to define the event in which the event source component is configured as a root node and the action component is configured as a leaf node. The event definition engine may set the hierarchical relationship of the event component through the plurality of event component wrappers. The event processing engine may produce the plurality of event component processes corresponding to respective ones of the plurality of event components included in the defined events, and constructs the plurality of event component processes to have a hierarchical structure same as that of the plurality of event components.

A first event component wrapper may be mapped to at least one second event component wrapper to define the hierarchical relationship, the first event component wrapper wrapping a first event component and the second event component wrapper, and the second event component wrapper wrapping a second event component. Moreover, the first and second event component wrappers may be hierarchically mapped such that the second event component wrapper executes after the first event component wrapper.

The event component wrappers may include an input/output value wrapper which wraps input/output data for corresponding event components. The input/output value wrappers may be configured to have a pair of identification values for the input/output data and an event context, and wherein the input/output data are input or output by the event context.

The event processing engine may include a search module which sequentially searches the defined events for at least one event component having a hierarchical relationship included in the defined events, a process producing module which produces at least one event component process to correspond 1:1 to at least one event component included in the defined events, and an event processing module which constructs a hierarchical structure of the event component processes to correspond to the hierarchical relationship between the event components and executes the defined events. Moreover, when the event is processed for the defined events, the event processing engine may store and reuses at least one event component process or a hierarchical structure unless changes for the defined events are generated.

In one embodiment, a method for event processing in a computer may include detecting an input associated with an event, selecting a plurality of event components for the event from a computer readable memory, determining a hierarchical relationship for the plurality of event components, generating a plurality of event component wrappers to wrap a corresponding event component based on the hierarchical relationship, and executing the plurality of event components in sequence according to the hierarchical relationship.

The plurality of event components may include at least one of an event source component related to an external event determination request, a database query component which acquires prescribed information for the event from a database, a stream component which produces operation information for data inputted during a prescribed time period, a rule determination component configured to determine whether another event component is subsequently executed according a prescribed formula, and an action component which provides an output for the event.

Moreover, the method may further include receiving information related to the hierarchical relationship of the event components, including whether a first event component in the hierarchical relationship has executed, and whether a last event component in the hierarchical relationship has executed by the action component.

The receiving information related to the hierarchical relationship of the event components may include inquiring event component information stored in relation to the event component wrapper, and generating event component processes using event components obtained through the inquiry. The method may further include searching for existing stored event definition information before generating the event component processes, and, when corresponding event component processes are stored, using the stored event component processes. Moreover, the generating the plurality of event component wrappers may include generating input/output value wrappers related to input/output values of corresponding event components for at least one of the event component wrappers.

In one embodiment, an event processing method for an event processing system configured to perform predetermined event processing to input data may include searching a computer readable memory for existing defined events and determining whether at least one event component or event component wrapper included in the existing defined events is stored, producing at least one event component process corresponding to the stored event component, and structuring at least one produced event component process to be mapped corresponding to a hierarchical structure of the stored event component and executing at least one structured event component process to process the defined events.

The searching the computer readable memory for existing defined events may include checking for at least one event component or event component wrapper included in the defined events, and checking for a hierarchical structure for at least one event component or event component wrapper. The method may also store event definition information including information for at least one produced event component process and associated hierarchical structure information when the processing for the existing defined events is completed. Moreover, the method may further include checking for event definition information for corresponding events, reusing the stored information of at least one existing produced event component process and associated the hierarchical structure information, and performing a reprocessing of the existing defined events when reprocessing for the existing defined events is requested.

In one embodiment, a computer readable medium is provided for recording a program to execute an event processing method for an event processing system configured to perform a predetermined event processing to input data. The program may include a function which provides a plurality of event components which are independent function units configured to process the event, a function which receives information of a hierarchical structure for at least one event component selected from a plurality of the provided event components, and a function which produces at least one event component wrapper wrapping at least one event component, produces the hierarchical structure corresponding to the information of the hierarchical structure in logical relation to at least one produced event component wrapper, and defines the events.

In one embodiment, a recording medium for recording a program is provided to execute an event processing method to be performed in an event processing system configured to process input data according to a predetermined event process. The program may include a function which searches the defined events and checks at least one event component, event component wrapper or a hierarchical structure associated with the event components included in the existing defined events, a function which produces at least one event component process corresponding to at least one checked event component, and a function which structures at least one produced event component process to be mapped to the checked hierarchical structure, executes at least one structured event component process, and processes the defined events.

In one embodiment, the plurality of event components may become independent function units for the event processing. In one embodiment, the event definition engine may set the event components having the hierarchical structure through the plurality of event component wrappers.

In one embodiment, the event components may include at least one of an event source component related to an outside event determination request, a database query component for acquiring the predetermined information on accessing an outside database, a stream component for producing operation information for data inputted during the predetermined period, a rule determination component capable of determining the execution or not of the following event components according to the predetermined formula, or an action component providing result data of the event.

In one embodiment, the event definition engine may use a tree structure in which the event source component becomes a root node and the action component becomes a leaf node, thereby to define the events.

In one embodiment, the event component wrappers may be logically and directly mapped with at least one second event component wrapper wrapping a first event component related and wrapped with oneself and at least one second event component related directly, to set the hierarchical structure. In one embodiment, the event component wrappers may set the mapping in one direction for the second event component wrapper to be executed after oneself is performed, to set the hierarchical structure.

In one embodiment, the event component wrappers may include input/output value wrappers wrapping input/output data for the event components wrapped in relation to oneself. In one embodiment, the input/output value wrappers may be configured with a pair of identification values for the input/output data and an event context, and the input/output data may be input or output by the event context.

In one embodiment, the event processing engine may include: a search module for sequentially searching the defined events and checking at least one event component having the hierarchical structure included in the defined events, a process producing module for producing at least one event component process corresponding by 1:1 to at least one event component included in the defined events, and an event processing module for constructing the hierarchical structure between the event component processes that become equal with the hierarchical structure between the event components and executing the defined events.

In one embodiment, when the first event processing is performed for the defined events, the event processing engine may store and reuse at least one event component process produced on the first processing or the hierarchical structure thereof unless changes for the defined events are generated.

The event processing method may be performed in the event processing system performing a predetermined event processing for input data in embodiments. The event processing method may include (a) providing independent function units for processing the events, that is, a plurality of event components, (b) receiving information of a hierarchical structure for at least one event component selected from a plurality of the provided event components, and (c) producing at least one event component wrapper wrapping at least one event component, respectively, producing the hierarchical structure corresponding to the information of the hierarchical structure in logical relation to at least one produced event component wrapper, and defining the events.

In one embodiment, the plurality of event components may include at least one of an event source component related to an outside event determination request, a database query component for acquiring the predetermined information on accessing an outside database, a stream component for producing operation information for data inputted during the predetermined period, a rule determination component capable of determining the execution or not of the following event components according to the predetermined formula, or an action component providing result data of the event.

In one embodiment, the step (b) may include: checking whether the starting of the corresponding hierarchical structure is performed, for the information of received hierarchical structure, by the event source component, and checking whether the ending of the hierarchical structure is performed by the action component.

In one embodiment, the step (c) may include producing the input/output value wrappers related to the input/output values of the corresponding event components for at least one event component wrappers, respectively.

The event processing method may be performed in the event processing system performing the predetermined event processing for input data in certain embodiments. The event processing may include (a) searching the existing defined events and checking at least one event component or event component wrapper included in the existing defined events, (b) producing at least one event component process corresponding to at least one checked event component, respectively, and (c) structuring at least one produced event component process to be mapped to the checked hierarchical structure, executing at least one structured event component process, and processing the defined events.

In one embodiment, the step (a) may include checking at least one event component or event component wrapper included in the defined events, and checking the hierarchical structure for at least one event component or event component wrapper. In one embodiment, the event processing method may further include (d) storing event definition information including the information of at least one produced event component process and the hierarchical structure thereof when the processing for existing defined events is completed.

In one embodiment, the event processing method may further include (e) checking event definition information for the corresponding events, reusing the information of at least one existing produced event component process and the hierarchical structure thereof, and performing the reprocessing, when reprocessing for the existing defined events is requested.

In one embodiment, the step (b) may further include inquiring event component information stored in relation to the event component wrapper, and producing event component processes for the corresponding event component processing by the inquiry result. In one embodiment, step (b) may further include checking the existing stored event definition information before producing the event component processes, and, when the corresponding event component processes are stored, acquiring the stored event component processes.

In one embodiment, a recording medium may record a program to execute an event processing method to be performed in an event processing system for performing the predetermined event processing to input data in embodiment. The program may include (a) a function providing independent function units for processing the events, that is, a plurality of event components, (b) a function receiving information of a hierarchical structure for at least one event component selected from a plurality of the provided event components, and (c) a function producing at least one event component wrapper wrapping at least one event component, respectively, producing the hierarchical structure corresponding to the information of the hierarchical structure in logical relation to at least one produced event component wrapper, and defining the events.

In one embodiment, a recording medium may record a program to execute an event processing method to be performed in an event processing system for performing the predetermined event processing to input data in embodiment. The program may include (a) a function searching the existing defined events and checking at least one event component or event component wrapper included in the existing defined events, (b) a function producing at least one event component process corresponding to at least one checked event component, respectively, and (c) a function structuring at least one produced event component process to be mapped to the checked hierarchical structure, executing at least one structured event component process, and processing the defined events.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for event processing, comprising:
a storage device; and
a processor using instructions stored on the storage device to generate
an interface to detect an input associated with an event;
an event definition engine which defines the event using a plurality of event components and a corresponding event component wrapper wrapping each of the plurality of event components;
an event processing engine which processes the event; and
an event action module to generate an output based on the event,
wherein the event definition engine determines a hierarchical relationship between the plurality of event components and assigns the hierarchical relationship in the corresponding event component wrapper,
wherein the event processing engine executes each of the event components according to the hierarchical relationship assigned in the event component wrapper, and
wherein the event processing engine includes
a search module which sequentially searches the defined events for at least one event component having a hierarchical relationship included in the defined events,
a process producing module which produces at least one event component process to correspond 1:1 to at least one event component included in the defined events, and
an event processing module which constructs a hierarchical structure of the event component processes to correspond to the hierarchical relationship between the event components and executes the defined events.

2. The system for event processing according to claim 1, wherein the plurality of event components are independent function units for the event processing.

3. The system for event processing according to claim 2, wherein the event components includes at least one of
an event source component related to an external event determination request,
a database query component which acquires prescribed information related to the event from an external database,
a stream component which produces operation information for data inputted during a prescribed period,
a rule determination component which determines whether another event component is to be according to a prescribed formula, and
an action component which provides an output of the event processing.

4. The system for event processing according to claim 3, wherein the event definition engine uses a tree structure to define the event in which the event source component is configured as a root node and the action component is configured as a leaf node.

5. The system for event processing according to claim 1, wherein the event definition engine sets the hierarchical relationship of the event component through the plurality of event component wrappers.

6. The system for event processing according to claim 5, wherein the event processing engine produces the plurality of event component processes corresponding to respective ones of the plurality of event components included in the defined events, and constructs the plurality of event component processes to have a hierarchical structure same as that of the plurality of event components.

7. The system for event processing according to claim 5, wherein a first event component wrapper is mapped to at least one second event component wrapper to define the hierarchical relationship, the first event component wrapper wrapping a first event component and the second event component wrapper, and the second event component wrapper wrapping a second event component.

8. The system for event processing according to claim 7, wherein the first and second event component wrappers are hierarchically mapped such that the second event component wrapper executes after the first event component wrapper.

9. The system for event processing according to claim 1, wherein the event component wrappers include an input/output value wrapper which wraps input/output data for corresponding event components.

10. The system for event processing according to claim 9, wherein the input/output value wrappers are configured to have a pair of identification values for the input/output data and an event context, and wherein the input/output data are input or output by the event context.

11. The system for event processing according to claim 1, wherein, when the event is processed for the defined events, the event processing engine stores and reuses at least one event component process or a hierarchical structure unless changes for the defined events are generated.

12. A method for event processing in a computer, comprising:
detecting an input associated with an event;
selecting a plurality of event components for the event from a computer readable memory;
determining a hierarchical relationship for the plurality of event components;
generating a plurality of event component wrappers to wrap a corresponding event component based on the hierarchical relationship;
executing the plurality of event components in sequence according to the hierarchical relationship; and
receiving information related to the hierarchical relationship of the event components, including
whether a first event component in the hierarchical relationship has executed, and whether a last event component in the hierarchical relationship has executed by the action component.

13. The event processing method according to claim 12, wherein the plurality of event components include at least one of
an event source component related to an external event determination request,
a database query component which acquires prescribed information for the event from a database,
a stream component which produces operation information for data inputted during a prescribed time period,
a rule determination component configured to determine whether another event component is subsequently executed according a prescribed formula, and
an action component which provides an output for the event.

14. The method according to claim 12, wherein the receiving information related to the hierarchical relationship of the event components includes
inquiring event component information stored in relation to the event component wrapper, and generating event component processes using event components obtained through the inquiry.

15. The event processing method according to claim 14, further including searching for existing stored event definition information before generating the event component processes, and, when corresponding event component processes are stored, using the stored event component processes.

16. The event processing method according to claim 12, wherein the generating the plurality of event component wrappers includes
generating input/output value wrappers related to input/output values of corresponding event components for at least one of the event component wrappers.

17. An event processing method for an event processing system configured to perform predetermined event processing to input data, comprising:
searching a computer readable memory for existing defined events and determining whether at least one event component or event component wrapper included in the existing defined events is stored;
producing at least one event component process corresponding to the stored event component; and
structuring at least one produced event component process to be mapped corresponding to a hierarchical structure of the stored event component and executing at least one structured event component process to process the defined events,
wherein the searching the computer readable memory for existing defined events includes
checking for at least one event component or event component wrapper included in the defined events,
checking for a hierarchical structure for at least one event component or event component wrapper,
storing event definition information including information for at least one produced event component process and associated hierarchical structure information when the processing for the existing defined events is completed, and checking for event definition information for corresponding events, reusing the stored information of at least one existing produced event component process and associated hierarchical structure information, and performing a reprocessing of the existing defined events when reprocessing for the existing defined events is requested.

* * * * *